Aug. 7, 1962 R. E. SCOTT 3,047,919
MOLDING RETAINER
Filed June 14, 1957 2 Sheets-Sheet 1
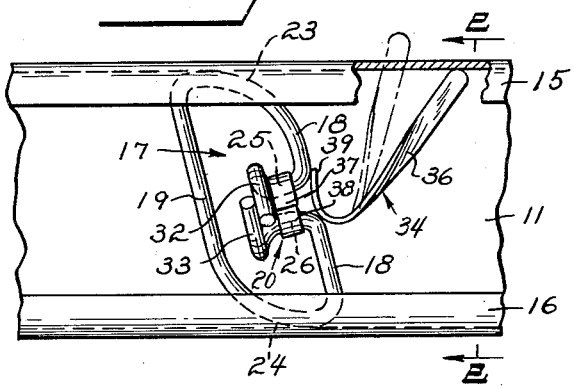
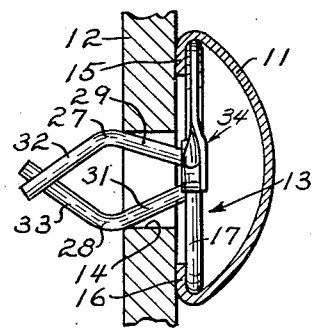
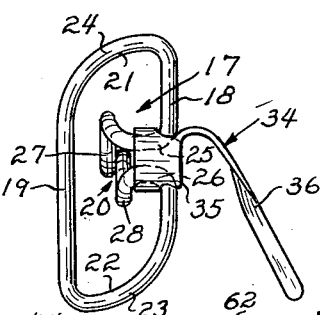
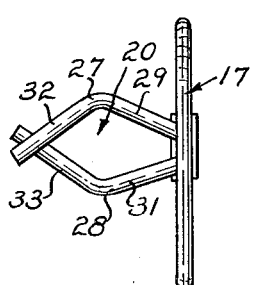
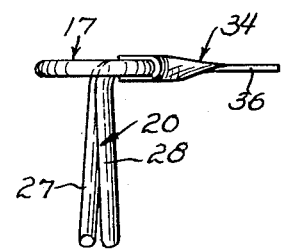
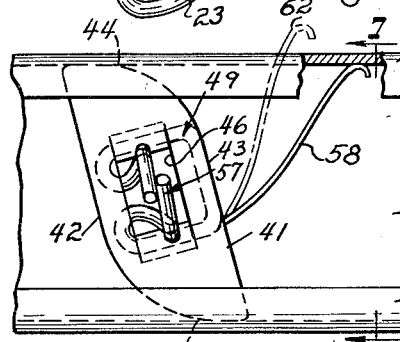
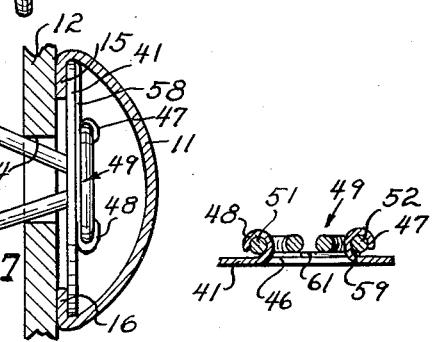
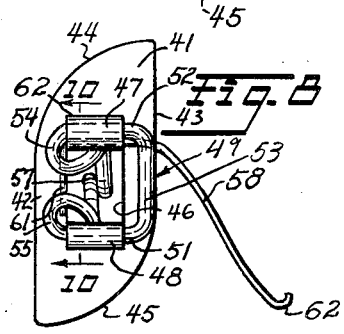
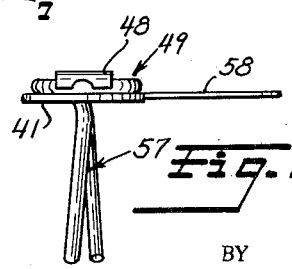
INVENTOR
ROBERT E. SCOTT
BY Strauch, Nolan & Neale
ATTORNEYS Aug. 7, 1962  R. E. SCOTT  3,047,919
MOLDING RETAINER Filed June 14, 1957  2 Sheets-Sheet 2

INVENTOR
ROBERT E. SCOTT

BY Strauch, Nolan & Neale

ATTORNEYS

United States Patent Office 3,047,919
Patented Aug. 7, 1962

3,047,919
MOLDING RETAINER
Robert E. Scott, Bloomfield Township, Oakland County, Mich., assignor to Gagnier Fibre Products Company, Oak Park, Mich., a corporation of Michigan
Filed June 14, 1957, Ser. No. 665,731
1 Claim. (Cl. 24—73)

This invention relates to molding retainers and particularly to retainers of this type for use with tapered or changing size molding strips.

Retainers of this type incorporating a molding engaging head, a snap fastener stud and a biasing arm for rocking the head into close fit with the molding have been proposed. The present invention contemplates a simplified but improved retainer construction which is easier and less expensive to make than prior structures and possesses excellent holding action.

It is therefore the major object of my invention to provide a molding strip retainer having a novel arrangement of molding engaging head, a snap fastener stud and resilient biasing arm.

A further object of the invention is to provide a novel molding retainer wherein the molding engaging head and snap fastener stud are rigid, and may be integral, and wherein a special lateral biasing arm is rigid, integral or clamped, to the head and projects outwardly to a bearing on the molding to suit the head to the width of the molding.

A further object of the invention is to provide a novel molding retainer wherein the head for engaging the molding flanges and the spring stud for snap fastening into the support aperture are formed from a single length of metal.

A further object of the invention is to provide a molding retainer assembly wherein the lateral spring arm for biasing the head to suit different molding widths is secured in a novel manner to the head.

It is a further object of the invention to provide a novel molding retainer having a molding flange engaging head, a spring stud and a lateral spring bias arm all formed from a single length of metal.

Further objects of the invention will presently appear as the description proceeds in connection with the appended claims and the annexed drawings wherein:

FIGURE 1 is a rear elevation of a retainer according to an embodiment of the invention mounted in a molding strip;

FIGURE 2 is a section on line 2—2 of FIGURE 1, showing the molding in position on a support;

FIGURE 3 is a top plan view of the retainer apart from the molding;

FIGURES 4 and 5 are side and end elevations respectively of the molding retainer of FIGURE 3;

FIGURE 6 is a rear elevation of a further embodiment showing the retainer in the molding;

FIGURE 7 is a section on line 7—7 of FIGURE 6;

FIGURE 8 is a top view of the retainer of FIGURES 6 and 7 apart from the molding;

FIGURE 9 is an end view of the retainer of FIGURE 8;

FIGURE 10 is a section on line 10—10 of FIGURE 9;

Figure 11:
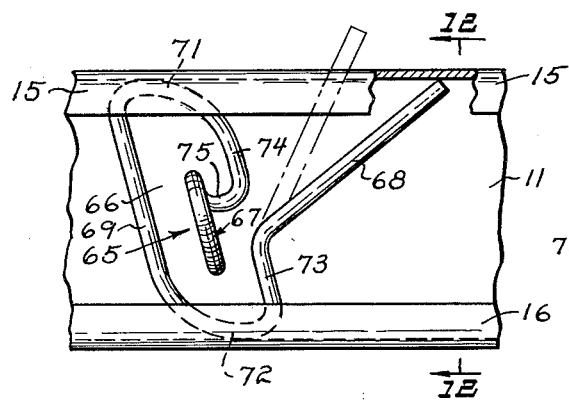
FIGURE 11 is a rear elevation of a one-piece molding retainer embodiment.
Figure 12:
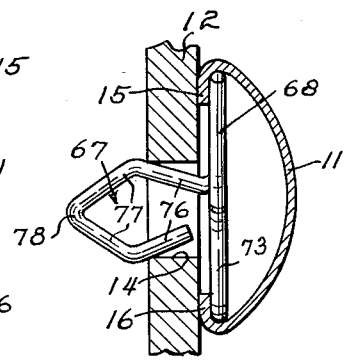
FIGURE 12 is a section on line 12—12 of FIGURE 11.
Figure 13:
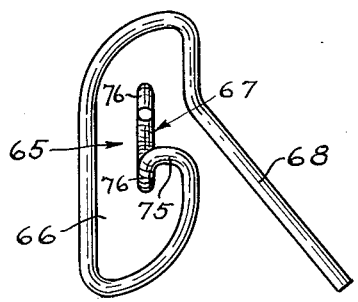
FIGURES 13, 14 and 15 are top, side and end views respectively of the retainer of FIGURES 11 and 12 apart from the molding.
Figure 14:
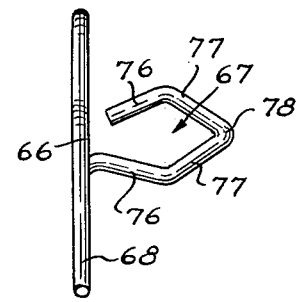
Figure 15:
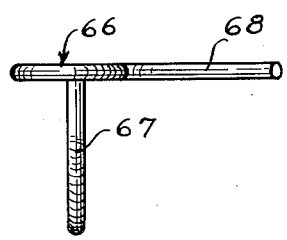

Referring to FIGURES 1–5, a molding strip 11 is secured to one side of a support 12 by a series of snap fasteners 13 passing through a corresponding series of circular apertures 14.

Molding 11 is a long strip of bendable sheet metal of selected shape with opposite side edge flanges 15 and 16 adapted to be engaged by the head of fasteners 13.

Each fastener 13 in this embodiment is made of two integral parts. One part provides the head and stud of the fastener, and the other part provides the spring biasing arm which as will appear constantly and tightly adapts the head to different molding widths.

The first part is made of a single length of shaped spring wire, preferably of round cross section, and the intermediate portion is formed essentially in a plane and having straight, generally parallel sides 18 and 19 and sloping ends 21 and 22. The external end surfaces 23 and 24 are curved and adapted to engage the bottoms of the molding channels at the bases of flanges 15 and 16 in the assembly.

The ends of the wire are of about equal length and coact to form a snap fastener stud 20. About midway of each head side 18 the wire end portions are bent laterally inwardly to provide substantially parallel closely spaced short arms 25 and 26 lying within the plane of the head. At the inner ends of arms 25 and 26 the wire ends are bent at about right angles to the plane of the head to form the stud legs 27 and 28. Legs 27 and 28 have coextensive opposite portions 29 and 31 diverging with respect to the head, and terminal portions 32 and 33 that converge and preferably actually slidably cross over each other at their ends as shown in FIGURE 4.

Looking at FIGURE 1 it will be observed that stud 20 is located at substantially the transverse center of the head structure 17, so that when the spring stud 20 is thrust into aperture 14 with its head 17 behind flanges 15, 16 the head 17 may be rotated about an axis normal to its center and thus reach the position where inclined surfaces 23 and 24 bear tightly against the opposite molding channels, without effecting the holding action of the stud in aperture 14.

In entering aperture 14, the converging stud leg portions first compress the stud laterally to pass through the hole 14 and then the stud legs spring outwardly to engage the diverging stud leg portions against the inner edges of the aperture 14, the expanding spring action of the stud camming the stud inwardly through the aperture and tightly holding the molding flanges 15, 16 against the support 12. This action of the stud is essentially the same as the fastener shown in Place Patent No. 1,679,266.

For holding the head 17 in its properly oriented position of rotation, which position is determined by the lateral distance between the molding flanges, there is provided a biasing part 34 that is here an integral piece of sheet metal clamped at one end 35 to the head at arms 25, 26 and terminating in a projecting spring arm 36 adapted to bear against one of the molding channels as shown in FIGURE 1.

The base end 35 of part 34 comprises spaced lips 37, 38 clenched over each other to effectively provide a loop closely encircling arms 25, 26. At the outer end of base 35 is an angular flat flange 39 that is bent away from the head and then reversely to form arm 36, and as illustrated the outer end of arm 36 is twisted about 90° to its initial plane to facilitate its bearing on the molding flange and increase its spring power. Thus one end of the spring biasing arm is here anchored to the head to provide a bending point and to prevent rotation of the spring arm out of the plane of the head.

When the fastener is slidably inserted into the end of the molding strip the arm 36, which when relaxed extends laterally at a substantially acute angle as shown in FIGURE 1, is bent away from the head to the full line position of FIGURE 1. Stressed arm 36 in this assembly functions as a compression spring tending to rock the head clockwise in FIGURE 1 and thereby maintain the head surfaces 23, 24 in close fit with the molding.

Referring to FIGURES 6–10, the retainer head comprises an oblong stiff sheet metal plate 41 having straight parallel longer side edges 42, 43 and opposed inclined, preferably curved, end edges 44, 45. A centrally disposed generally rectangular aperture 46 is formed in the head, and some of the metal at opposite edges of the aperture is bent outwardly to provide clips 47 and 48 for attachment of a snap fastener as will appear.

A snap fastener unit having a generally rectangular outline head is formed from a single length of metal, the head 49 having parallel sides 51 and 52 that are clamped tightly against one side of the retainer head 41 by clips 47 and 48. At one end fastener head sides 51, 52 are joined by a straight side 53, but at the other end they are joined to short side sections 54, 55 that extend toward each other and then inwardly to approximately the center of the fastener head and then through the retainer head aperture 46 to provide a snap fastener stud 57 at the opposite side of plate 41 from fastener head 49. The legs of this stud diverge and then converge like the legs 27, 28 of stud 20, and provide the same holding action when thrust through the support aperture.

In this embodiment the lateral biasing arm 58 tending to rock head 41 clockwise in the assembly of FIGURE 6 constitutes a single length of spring wire which has an intermediate length 59 clamped tightly between the fastener head side 52 and clip 47 and a right angled terminal section 61 extending along the edge of aperture 46 trapped under the fastener head. The outer end of spring arm 58 terminates in a rounded bearing portion 62 adapted to engage the bottom of the molding channel. Thus spring arm 58 is anchored at one end on the retainer head, extension 61 preventing it from rotating out of the plane of head 41, and is flexible in the plane of head 41.

The snap fastener which may be of conventional construction is mounted on the retainer head 41 with the stud 57 projecting through aperture 46, the end of spring arm 58 is inserted under the fastener head 49 and then clips 47 and 48 are tightly clenched over the sides 51, 52 of fastener head 49 to also trap the spring arm end on the head.

Each of the foregoing embodiments comprises a generally flat head adapted to span the molding side flanges regardless of molding width, a snap fastener stud projecting from the head and a laterally biasing spring arm having one end anchored on the head and projecting to engage within one of the molding flanges at its free end.

The embodiment of FIGURES 11-15 provides a one-piece spring wire construction at 65 wherein the retainer head, snap fastener stud and lateral biasing spring arm are all fashioned from a single length of metal.

Retainer 65 consists of an oblong head 66 formed from an intermediate section of the length of wire, snap fastener stud 67 formed from one end of the wire length, and the spring biasing arm 68 formed from the other end.

Head 66 has parallel long sides, one side 69 being straight between the opposed inclined curved surface ends 71 and 72. The other long side comprises two sections 73 and 74 extending toward each other. Section 74 has a right angle arm 75 extending to the center of the head and this arm continues at right angles to the head to form a J-shaped spring stud 67 consisting of diverging leg sections 76 and converging leg sections 77 united by a nose 78, one diverging leg 76 being integral with head arm 75.

Arm 68 is an outwardly inclined extension of the head side section 73 which is normally in the dotted line position of FIGURE 11 but is stressed to the full line position of FIGURE 7 in the assembly.

This retainer functions in the molding assembly essentially as the other embodiments. Common with the FIGURES 1-5 embodiment it has the spring stud integral with the retainer head. It will be appreciated that in practice a large number of these retainers are slidably inserted into one end of the molding strip each adapting itself to the molding width, and located according to the apertures in the support, and then the whole molding strip is mounted on the support by inserting the spring studs and pushing inwardly.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim is therefore intended to be embraced therein.

What is claimed and desired to be secured by United States Letters Patent is:

In a retainer assembly for securing a molding upon an apertured support, a head structure formed from a single length of metal into a generally oblong loop lying generally in a plane and formed with opposed arcuate end surfaces adapting the head to fit snugly within molding sections of different widths, a snap fastener stud projecting at right angles from approximately the center of said head and comprising spaced spring legs each of which is an integral extension of an opposite end of said length of metal, and a lateral spring arm flexible in the plane of said head rigid at one end with said head and projecting angularly therefrom to terminate in a molding engaging portion in the assembly, said head structure having spaced integral short arms at the upper ends of said legs, and said spring arm comprising a flexible length of metal having one end fixed upon said short arms so that the spring arm is anchored and prevented from rotation out of the plane of the head, and said spring arm projecting angularly from said anchorage.

References Cited in the file of this patent

UNITED STATES PATENTS

| | | |
|---|---|---|
| 1,679,266 | Place | July 31, 1928 |
| 1,964,331 | Place | June 26, 1934 |
| 2,124,252 | Lavigne | July 19, 1938 |
| 2,163,455 | Van Uum | June 20, 1939 |
| 2,197,590 | Place | Apr. 16, 1940 |
| 2,215,428 | Place | Sept. 17, 1940 |
| 2,677,862 | Flora et al. | May 11, 1954 |
| 2,695,434 | Bedford | Nov. 30, 1954 |
| 2,695,435 | Bedford | Nov. 30, 1954 |
| 2,709,286 | Bedford | May 31, 1955 |
| 2,716,263 | Flora et al. | Aug. 30, 1955 |

FOREIGN PATENTS

| | | |
|---|---|---|
| 1,015,245 | France | July 2, 1952 |